United States Patent
Riggert et al.

(10) Patent No.: US 11,751,579 B2
(45) Date of Patent: Sep. 12, 2023

(54) TRANSPORT APPARATUS FOR TRANSPORTING EVISCERATED POULTRY CARCASSES OR PARTS THEREOF, AND APPARATUS AND METHOD FOR ATTACHING AND PROCESSING THE POULTRY CARCASSES OR PARTS THEREOF

(71) Applicant: Nordischer Maschinenbau Rud. Baader GmbH + Co. KG, Lübeck (DE)

(72) Inventors: Lasse Riggert, Lübeck (DE); Andreas Landt, Lübeck (DE)

(73) Assignee: NORDISCHER MASCHINENBAU RUD. BAADER GMBH + CO. KG, Lubeck (DE)

( * ) Notice: Subject to any disclaimer, the term of this patent is extended or adjusted under 35 U.S.C. 154(b) by 0 days.

(21) Appl. No.: 17/925,254

(22) PCT Filed: May 15, 2020

(86) PCT No.: PCT/EP2020/063731
§ 371 (c)(1),
(2) Date: Nov. 14, 2022

(87) PCT Pub. No.: WO2021/228413
PCT Pub. Date: Nov. 18, 2021

(65) Prior Publication Data
US 2023/0189828 A1    Jun. 22, 2023

(51) Int. Cl.
*A22C 21/00* (2006.01)
*B65G 17/32* (2006.01)

(52) U.S. Cl.
CPC ........ *A22C 21/0053* (2013.01); *B65G 17/323* (2013.01); *B65G 2201/0202* (2013.01)

(58) Field of Classification Search
CPC .............. A22C 21/0053; B65G 17/323; B65G 2201/0202
(Continued)

(56) References Cited

U.S. PATENT DOCUMENTS

| 4,272,863 A | 6/1981 | Parker, Jr. |
| 9,004,988 B2 | 4/2015 | Van Der Steen et al. |

(Continued)

FOREIGN PATENT DOCUMENTS

| CN | 106063500 A | 11/2016 |
| CN | 110313508 A | 10/2019 |

(Continued)

*Primary Examiner* — Richard T Price, Jr.
(74) *Attorney, Agent, or Firm* — DINSMORE & SHOHL LLP

(57) ABSTRACT

A transport apparatus for poultry bodies/parts includes a frame, a transport unit on the frame with a revolvingly driven transport device, and a holding apparatus for saddling/holding the poultry during transport/processing. The holding apparatus includes a clamping device with a clamping hook pivotable by an actuating mechanism about a rotational axis from a standby into a clamping position and back. The actuating mechanism includes an adjusting lever pivotable about a rotational axis into connection with an actuating member, on the frame along the transport path, for pivoting the adjusting lever and hook. The holding apparatus rotates relative to the transport device about an axis perpendicular to the transport direction, and is brought into operative connection with an actuating lever on the frame. The adjusting lever rotational axis is oriented perpendicular to the hook axis. The actuating lever for rotating the holding apparatus is before the adjusting lever actuating member.

20 Claims, 11 Drawing Sheets

(58) Field of Classification Search
USPC .......................................................... 452/179
See application file for complete search history.

(56) References Cited

U.S. PATENT DOCUMENTS

| | | |
|---|---|---|
| 9,192,172 B2 | 11/2015 | Van Der Steen et al. |
| 9,700,060 B2 | 7/2017 | Inoue et al. |
| 9,717,257 B2 | 8/2017 | Van Der Steen et al. |
| 11,102,989 B2 | 8/2021 | Van Der Waal et al. |
| 11,213,039 B2 * | 1/2022 | Riggert .............. A22C 21/0053 |
| 2009/0275275 A1 | 11/2009 | Evers |
| 2012/0315834 A1 | 12/2012 | Van Der Steen et al. |
| 2013/0029574 A1 | 1/2013 | Van Der Steen et al. |
| 2016/0037787 A1 | 2/2016 | Van Der Steen et al. |
| 2019/0297903 A1 | 10/2019 | Van Der Waal et al. |
| 2020/0138049 A1 * | 5/2020 | Riggert .................. A22B 7/003 |

FOREIGN PATENT DOCUMENTS

| | | |
|---|---|---|
| EP | 0668018 A1 | 8/1995 |
| KR | 20180038292 A | 4/2018 |
| WO | 2019001728 A1 | 1/2019 |
| WO | 2019145203 A1 | 8/2019 |

* cited by examiner

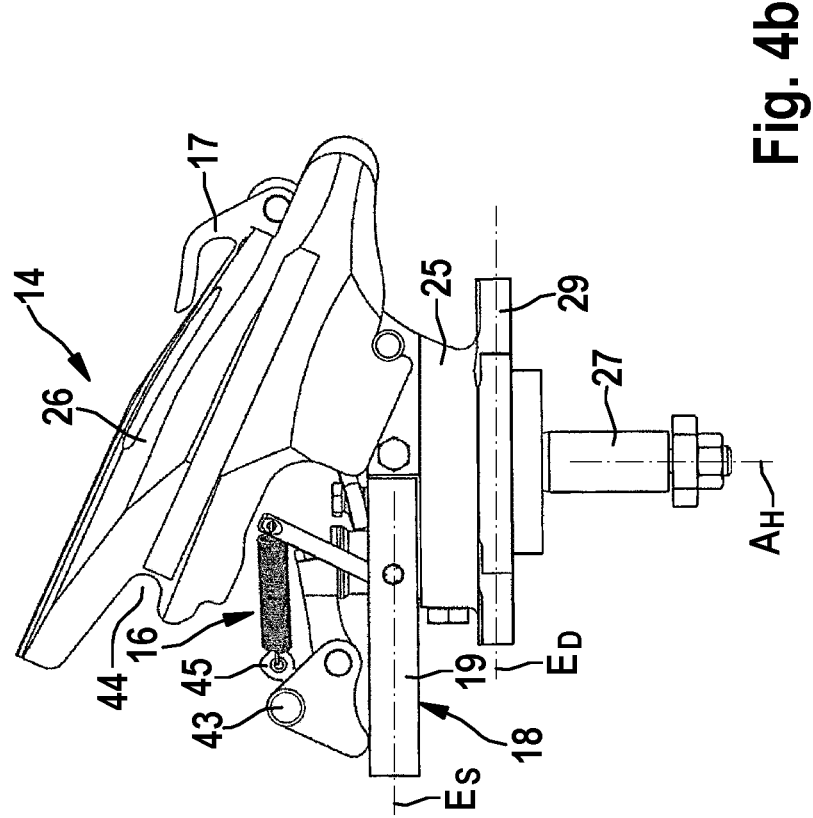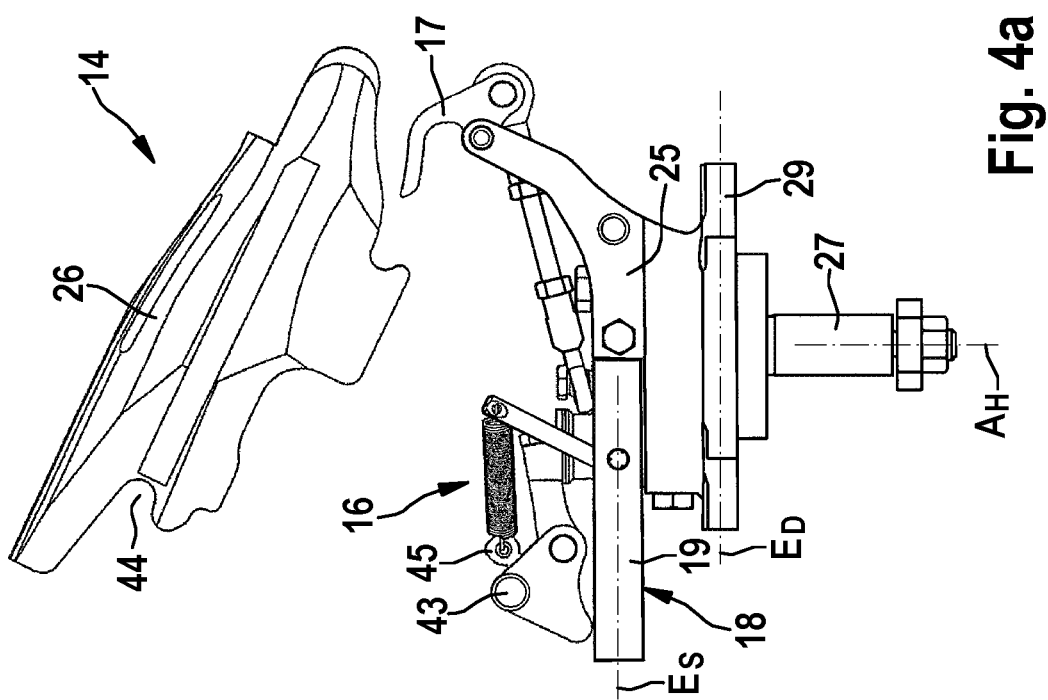

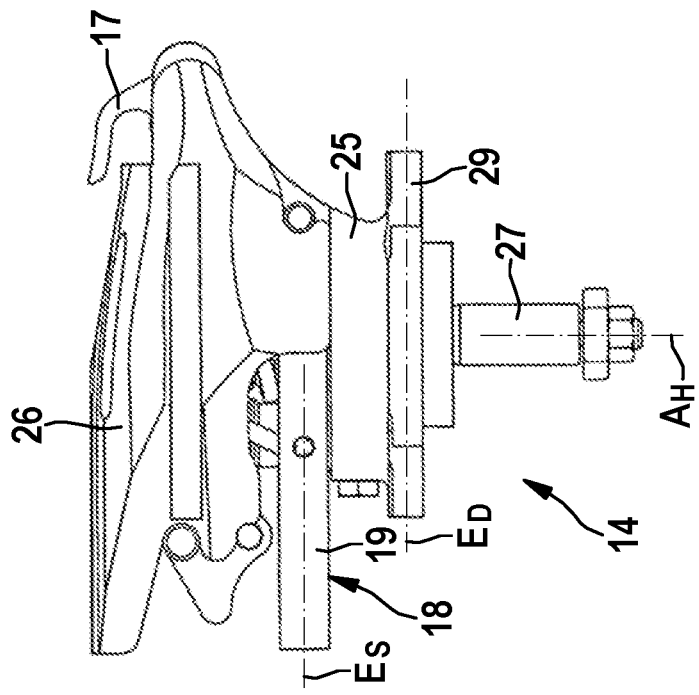
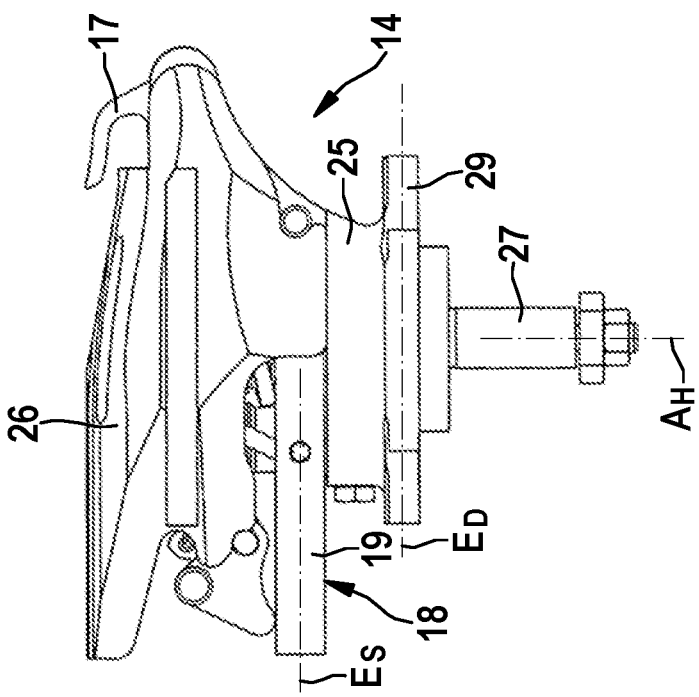

TRANSPORT APPARATUS FOR TRANSPORTING EVISCERATED POULTRY CARCASSES OR PARTS THEREOF, AND APPARATUS AND METHOD FOR ATTACHING AND PROCESSING THE POULTRY CARCASSES OR PARTS THEREOF

CROSS-REFERENCE TO RELATED APPLICATIONS

This application is the U.S. National Stage of PCT/EP2020/063731 filed on May 15, 2020, the entire content is incorporated herein by reference in its entirety.

FIELD OF THE INVENTION

The invention relates to a transport apparatus, configured and adapted for transporting eviscerated poultry bodies or parts thereof, in particular front halves of the poultry bodies, in a transport direction T along a transport path, comprising a frame, a transport unit mounted on the frame and having a revolvingly driven transport means, and at least one holding apparatus which is fastened to the transport means and is configured and adapted for saddling and holding the poultry body or the part thereof during transport and during processing in an apparatus for processing poultry bodies or parts thereof, wherein the holding apparatus comprises a clamping device which has a clamping hook for fixing the poultry body or the part thereof, which clamping hook is configured to be pivotable by means of an actuating mechanism about a rotational axis $D_K$ from a standby position into a clamping position and back, wherein the actuating mechanism comprises an adjusting lever which is configured to be pivotable about a rotational axis $D_S$ and can be brought into operative connection with an actuating member, which is arranged on the frame along the transport path, for pivoting the adjusting lever and thus for pivoting the clamping hook.

The invention relates further to an apparatus for processing eviscerated poultry bodies or parts thereof, in particular front halves of the poultry bodies, comprising a transport apparatus for transporting the poultry bodies or parts thereof along at least one processing station for processing the poultry bodies or parts thereof, and at least one processing station for processing the poultry bodies or parts thereof.

The invention is further directed to a method for saddling and processing an eviscerated poultry body or a part thereof, in particular a front half of the poultry body.

BACKGROUND OF THE INVENTION

Such transport apparatuses, apparatuses and methods are used in the poultry-processing industry. In the poultry-processing industry, eviscerated poultry bodies or parts thereof, in particular so-called front halves, are held and transported in corresponding transport apparatuses and processed in the apparatuses. For processing, the poultry bodies or parts thereof are to be transported by means of the transport means of the transport unit along the transport path through the processing stations and are to be positioned in relation to the respective processing stations of the apparatus. Conventionally, a plurality of holding apparatuses is fastened to a revolving driven transport means of the transport unit and by means of which the poultry bodies or parts thereof are fed to one or more processing stations or brought into the effective range thereof. The revolving driven transport means, which is guided around deflection and/or drive elements, thereby forms an upper run and a lower run. The upper run and the lower run can lie directly one above the other in a vertical plane, so that the drive and/or rotational axes $D_U$ of the deflection elements are oriented substantially horizontally. The plane can, however, also be inclined, for example by 45° to the vertical (inclined position of the drive and/or rotational axes $D_U$ of the deflection elements), so that the upper run and the lower run lie one above the other in an obliquely offset manner. The upper run and the lower run can also lie side by side in a plane, wherein the rotational axes $D_U$ of the deflection elements are then oriented substantially vertically. The processing stations, at which the poultry bodies or parts thereof can be processed in a vertical orientation to the transport direction T or in an orientation parallel to the transport direction T, are correspondingly positioned.

For processing, the poultry bodies or parts thereof are brought to the holding apparatus automatically or manually and are oriented, centred and fixed manually or semi-automatically. This process as a whole is also referred to as saddling or loading. For high-quality and yield-efficient processing of the poultry bodies or parts thereof, secure and especially symmetrical saddling of the poultry bodies or parts thereof onto the holding apparatus is necessary. Saddling comprises first placing the poultry bodies or the parts thereof loosely on the holding apparatus. For complete saddling, the respective poultry body or the part thereof must be oriented and centred on the holding apparatus, pressed with force onto the holding apparatus and then fixed by bringing the clamping hook out of its standby position into its clamping position.

As mentioned, the symmetrical and secure saddling of poultry bodies or parts thereof, in particular of front halves, onto the holding apparatus is of particular relevance. Taking the example of a front half, the poultry bodies to be processed have a carcass which comprises at least parts of a breastbone. A breast plate is part of the breastbone, which further comprises the so-called breastbone crest, also referred to as the keel bone. The breast plate and the breastbone crest accordingly form the breastbone, which is T-shaped in cross-section. The breast plate thereby forms the short stroke of the T, while the breastbone crest forms the long stroke of the T. In the processing of front halves, for example when cutting free the breastbone, secure and symmetrical saddling of the front halves onto the holding apparatus is particularly important in order that the front halves are oriented and centred in an optimised manner when they are fed to the respective processing stations.

Because of the high work cycle rate, on the one hand, and the force that is to be applied under ergonomically suboptimal conditions, on the other hand, manual saddling is an arduous and demanding activity which additionally requires extensive experience on the part of the operator in order to completely saddle the poultry bodies or parts thereof onto the holding apparatus in a centred and fixed manner— usually while the holding apparatus is being transported in the transport direction T. At least semi-automatic saddling aids are accordingly provided. Transport apparatuses of the type according to the preamble are known, in which the holding apparatuses are arranged fixedly and non-rotatably relative to the transport means in an orientation parallel to the transport direction T and revolve with the transport means in the upper run and in the lower run, which runs in the same plane beneath the upper run. The known holding apparatuses have an adjusting lever which is pivotable about a rotational axis $D_S$ which is oriented parallel to the rotational axis $D_K$ of the clamping lever. As a result, the adjusting lever projects almost downwards into a transport plane which is described by the holding apparatuses transported in the transport direction T. In other words, the adjusting lever is arranged and oriented such that pivoting thereof takes place in a plane which is oriented parallel to the vertical centre plane of the holding apparatus, or lies in that plane, and is perpendicular to the transport plane.

In those holding apparatuses, saddling takes place, owing to their rigid, horizontal orientation, parallel to the transport direction T in the horizontal orientation of the holding apparatus. To that end, the poultry bodies or the parts thereof are manually positioned in front of the holding apparatuses transported in the transport direction T and placed onto the holding apparatuses. As a result of further transport in the transport direction T, fixing of the poultry bodies or of the parts thereof takes place by way of the holding apparatus itself in that, during transport, the adjusting lever comes into operative connection or engagement with the actuating member on the frame, by means of which the clamping hook is moved from the standby position into the clamping position. This design has the disadvantage, on the one hand, that the poultry bodies, depending on the quality of the loading, may not be sufficiently centred, which can lead to impairments in the processing result. On the other hand, manual positioning in front of the holding apparatuses oriented horizontally and parallel to the transport direction T is time-consuming (at the expense of a higher cycle speed) and ergonomically unsatisfactory, or user-unfriendly. For user-friendly saddling without increased effort, it is easier from the point of view of handling to place the front halves onto a vertically oriented holding apparatus. Saddling, that is to say loading of the holding apparatuses with poultry bodies or the parts thereof, cannot be carried out in transport apparatuses having vertically oriented holding apparatuses of the known type. The adjusting lever does not allow the known holding apparatus to be rotated into a position in which the holding apparatus is vertical to the transport direction, because rotation would cause a collision with other components of the transport apparatus.

SUMMARY OF THE INVENTION

Accordingly, the object of the invention is to provide a compact transport apparatus which is optimised in terms of handling and which ensures simple and precise saddling of the poultry bodies or of the parts thereof. The object consists further in proposing a corresponding apparatus and a corresponding method.

This object is achieved by a transport apparatus of the type mentioned hereinbefore in that the holding apparatus is configured and adapted to be rotatable relative to the transport means about an axis $A_H$, which runs perpendicular to the transport direction T, and to that end can be brought into operative connection with an actuating lever which is arranged on the frame along the transport path, and in that the rotational axis $D_S$ of the adjusting lever is oriented perpendicular to the rotational axis $D_K$ of the clamping hook, wherein the actuating lever for rotating the holding apparatus is arranged before, in the transport direction T, the actuating member for actuating the adjusting lever. As a result of the rotatable configuration of the holding apparatus about the rotational axis $A_H$, it is possible, at least for saddling, to bring the holding apparatus, by engagement of the actuating lever, into a vertical position in which the operator, optionally also an automated handling aid, such as, for example, a robot, can quickly and reliably place the poultry bodies or the parts thereof onto the holding apparatus without any effort. Simple placing requires no force and in particular no experience with regard to centring and can be carried out at a high work cycle rate, in order to increase output, and by any operator. As a result of the configuration or orientation according to the invention of the rotational axes $D_S$ (of the adjusting lever) and $D_K$ (of the clamping hook), simple and precise actuation of the adjusting lever is further ensured in particular also when the holding apparatus is oriented vertically. This means that the plane in which the adjusting lever lies and can be pivoted is oriented perpendicular to the vertical centre plane of the holding apparatus and is parallel to the transport plane which is described by the holding apparatuses transported in the transport direction T. Safe and collision-free rotation of the holding apparatuses about the rotational axis $A_H$ and simple and reliable actuation of the adjusting lever by the actuating member are thus ensured.

The holding apparatus advantageously comprises a fastening body and a supporting body which is releasably fastened to the fastening body, wherein the fastening body is rotatably mounted about the rotational axis $A_H$ by means of a shaft in a bearing plate fastened to the transport means and comprises a rotating element, preferably a rotating cross, which spans a plane $E_D$ which, for rotation of the fastening body and thus of the holding apparatus about the axis $A_H$, can be brought into operative connection with the actuating lever. The plane $E_D$ spanned by the rotating element runs on the one hand parallel to the plane $E_L$ spanned by the bearing plate and also parallel to the respective transport plane $E_T$. The actuating lever for triggering the rotating movement of the holding apparatus can be an actively controlled lever. Preferably, however, it is a fixed lever which projects into the transport path such that the rotating element, taking the example of a rotating cross, particular preference is given to a so-called maltese cross, "threads" with recesses into the lever, so that further transport of the holding apparatus in the transport direction T leads to a rotation of the holding apparatus through approximately 90°, whereby the holding apparatus can be moved from a position oriented horizontally and parallel to the transport direction T into a position oriented perpendicular to the transport direction T and back.

A particularly preferred further development of the holding apparatus is characterised in that the adjusting lever spanning a plane $E_S$ comprises an eccentric plate portion and an adjusting portion, and the rotational axis $D_S$ of the adjusting lever runs parallel to and spaced apart from the axis $A_H$, wherein the adjusting lever is pivotable relative to the rotating element and the plane $E_S$ and the plane $E_D$ run substantially parallel to one another. The adjusting lever is a planar lever. The adjusting portion, which protrudes virtually in the shape of a lug, can be brought into contact with the actuating lever during or as a result of the transport of the holding apparatus in the transport direction T, so that the adjusting lever is pivoted or rotated about the rotational axis $D_S$. Pivoting (which in connection with the invention is also referred to synonymously as rotation) of the adjusting lever is to be transmitted by means of the actuating mechanism, which cooperates with the eccentric plate portion, to the clamping hook. The parallel arrangement of the adjusting lever and the rotating element with planes $E_S$ and $E_D$ running in parallel permits a compact and secure construction of the holding apparatus for transmitting the pivot movement of the adjusting lever to the clamping hook. Other configurations of the adjusting lever and other force- and/or pivot movement-transmitting mechanisms can likewise be used.

The clamping hook of the clamping device is advantageously pivotably mounted on a holding structure, which in turn is connected to the fastening body, and the adjusting lever and the clamping hook are connected together by way of an adjusting rod, such that the adjusting rod is connected at one end in an articulated and eccentric manner to the eccentric plate portion of the adjusting lever and is connected at the opposite end in an articulated manner to the clamping hook, such that the adjusting lever for moving the clamping hook is movably configured and adapted to be movable from a release position past a dead centre into a closed position and back. In other words, the point of articulation of the adjusting rod with the eccentric portion of the adjusting lever is formed eccentrically to the rotational axis $D_S$ of the adjusting lever. A type of conventional toggle lever is thereby formed. The holding structure can be formed, for example, by two carrying arms which are releasably arranged on the fastening body. A spindle is arranged between the two carrying arms and is mounted or arranged with each of its opposite ends on one carrying arm. The clamping hook is arranged in a rotatably mounted manner on the spindle. Other designs of the holding structure are, however, likewise possible. Without the adjusting rod, the clamping hook would in some circumstances be able to oscillate freely. By attaching it to the adjusting rod, however, the position of the clamping hook is dependent on the position of the adjusting lever.

The adjusting lever is particularly preferably spring-biased, wherein a spring element is tensioned between the fastening body and the adjusting lever, such that, both in the release position and in the closed position, the adjusting lever is held in the respective position. The spring element can be tensioned, for example, between a fixed element of the fastening body, on the one hand, and a pin-like body, on the other hand, which is likewise arranged on the eccentric portion eccentrically to the rotational axis $D_S$. The pin can be oriented perpendicular to the adjusting lever or to the plane $E_S$ spanned by the adjusting lever. Preferably, however, the pin is inclined slightly relative to the perpendicular orientation, preferably by an angle β of approximately from 10° to 30°. The fastening of the spring element to the fastening body can, however, also be arranged on a movable element, for example on a rocker lever of the fastening body, which is pivotably arranged on the fastening body and at the same time is configured and adapted as a locking element for the supporting body on the fastening body. To that end, the rocker lever has corresponding latching lugs which can be brought into engagement with corresponding recesses in the supporting body. The spring element can be arranged directly on the rocker lever. In other variants, the spring element can be arranged on a bolt or the like which is preferably releasably fastened to the rocker lever. Instead of the spring element, a pneumatic cylinder, for example, can also be used.

In a particularly advantageous embodiment of the transport apparatus according to the invention, a saddling assist apparatus is arranged after, in the transport direction T, the actuating lever for rotating the holding apparatus from a position oriented substantially vertical to the transport direction T into a position oriented substantially parallel to the transport direction T, which saddling assist apparatus comprises the actuating member for actuating the adjusting lever. By means of the saddling assist apparatus, it is possible to centre the poultry body, which is ultimately placed only loosely, and to press it firmly onto the holding apparatus and fix it there automatically, that is to say without human intervention, in that the actuating member of the saddling assist apparatus comes into operative connection with the adjusting lever. In simple terms, the saddling assist apparatus lies in the transport path of the holding apparatus, such that, during transport, the holding apparatus having the poultry body or the part thereof meets the saddling assist apparatus, whereby, as a result of continued transport, the poultry body or the parts thereof is centred on the holding apparatus before the actuating member, via the adjusting lever, moves the clamping hook from the standby position into the clamping position. As a result of the cooperation of the holding apparatus and the saddling assist apparatus, centring and locking are to be carried out virtually simultaneously, so that a symmetrical position of the poultry body or of the part thereof on the holding apparatus for optimised processing is ensured. The saddling assist apparatus, with the exception of the actuating member, is preferably of passive form, whereby a particularly simple and compact construction is ensured.

The actuating member particularly preferably comprises a pivot lever which is movable by means of a pneumatic cylinder from a standby position into an actuating position and back, such that the adjusting lever of the actuating mechanism can be brought from a release position past a dead centre into a closed position. As a result of the toggle lever effect, the adjusting lever remains in front of or behind the dead centre in its respective position and can ultimately be moved into a different position only by the application of force. Instead of the pneumatic cylinder, other adjusting elements, such as, for example, a servomotor or the like, can also be used.

An advantageous further development is characterised in that the saddling assist apparatus comprises at least one impactimpact plate which projects into the transport path in a starting position and is spring-mounted, such that the impactimpact plate is movable against a spring force into a guiding position by any holding apparatus having the poultry body or part thereof that is transported along the transport path. This impactimpact plate, there may also be, for example, two impactimpact plates, is arranged on the entry side, based on the saddling assist apparatus, such that the first contact of the poultry body or of the part thereof takes place with the impactimpact plate. The impactimpact plate "receives", as it were, the poultry body or the part thereof, which is in rotation and not yet fixed on the holding apparatus, and ensures that uncontrolled movements between the poultry bodies or the parts thereof and the holding apparatus are prevented or at least reduced. The guiding position extends over a plurality of positions, because the impactimpact plate, bearing on the poultry body or the part thereof, is gradually pushed into a substantially horizontal orientation.

To that end, the impactimpact plate is particularly preferably arranged in the transport direction T approximately at the height of the actuating lever for rotating the holding apparatus and is held against an abutment in its starting position by means of a spring element. Instead of the spring element, other damping members, such as, for example, a pneumatic cylinder, can also be used.

A preferred embodiment is characterised in that the saddling assist apparatus comprises a pressing device which has two spring-mounted pressure plates which are configured and adapted for guiding and/or holding the poultry body or the part thereof on the holding apparatus. This pressing device, which is arranged after the impact plate in the transport direction T, ensures that the poultry body or the part thereof is pressed firmly and flatly onto the holding apparatus by the clamping hook immediately before and during fixing. Ultimately, the pressing device exerts pressure on the breast plate, so that the breast plate lies as closely and tightly as possible against the supporting body of the holding apparatus, in order to ensure reliable penetration/insertion of the clamping hook above the breast plate for precise and secure fixing.

In an advantageous further development, the two pressure plates are synchronised in respect of movability towards one another and away from one another by way of a synchronous gear, wherein the two pressure plates are each held against an abutment in a standby position by a spring element. The pressure plates, which can also be referred to as pressure arms, can be configured to be movable independently of one another. To that end, the pressure plates are each rotatably/pivotably mounted on the fastening body individually and separately. Preferably, however, the two pressure plates are synchronised with one another by way of, for example, intermeshing toothed segments or the like. The spring element is tensioned between the two pressure plates, such that they are held towards one another and the poultry body or the part thereof entering in the transport direction T pushes the pressure plates apart against the spring force, whereby a centring and holding force acts on the poultry body or the part thereof, by means of which saddling is completed.

In a preferred embodiment, the pressure plates run in the transport direction T in two planes in such a manner that they are inclined relative to one another and converge. An increasing pressure is thus exerted on the poultry body or the part thereof in the transport direction T, specifically from two sides or from both sides in each case in two directions. In simple terms, the double inclined position of the pressure plates ensures that the poultry body or the part thereof is pressed onto the holding apparatus from above and from the front contrary to the transport direction T. In other embodiments, the pressure plates can also run parallel to one another and/or can be oriented linearly.

In a further particularly advantageous embodiment, the saddling assist apparatus comprises a centring device for centring the poultry body or part thereof on the holding apparatus, which centring device has a forked element which is arranged on a carrying frame of the saddling assist apparatus in such a manner that it can be deflected against the spring force of a spring element. The centring device is configured and adapted to prevent or at least limit rotation of the poultry body or of the part thereof after it has been rotated into the horizontal orientation and behind the impactimpact plate in the transport direction T and until it is finally fixed by the clamping hook.

The forked element expediently has two bars which are arranged spaced apart from one another and are configured and adapted for centring a breastbone crest of the poultry body or part thereof to be transported. By means of these circular guides on both sides of the vertical centre plane of the holding apparatus, the poultry body or the part thereof can be directed in a centred and guided manner into the region in which the clamping hook is released. The increasing spring loading in the transport direction T holds the poultry body or the part thereof securely in position. Instead of the spring element, other damping elements can also be used.

The object is also achieved by an apparatus for processing eviscerated poultry bodies or parts thereof, in particular front halves of the poultry bodies, having the features mentioned hereinbefore, in that the transport apparatus for transporting the poultry bodies or parts thereof is configured and adapted as disclosed herein.

The advantages arising therefrom have already been described in connection with the transport apparatus, and for this reason, in order to avoid repetition, reference is made to the corresponding passages.

The object is further achieved by the method mentioned hereinbefore, which is characterised by the following steps: placing the poultry body from the top down onto a substantially vertically oriented holding apparatus of a transport apparatus, rotating the holding apparatus and thus the poultry body or part thereof, which is still free, from the position oriented substantially vertical to the transport direction T into a position oriented substantially parallel to the transport direction T during transport of the poultry body or part thereof in the transport direction T along a transport path, fixing the poultry body or the part thereof on the holding apparatus by triggering a pivot movement of a clamping hook from a standby position into a clamping position during transport in the transport direction T, and processing the poultry body or part thereof during transport thereof at least one processing station arranged along the transport path. The saddling process, that is to say complete saddling, is effectively divided into two steps, namely a first step, which can be carried out easily and without experience, manually or automatically, in which the holding apparatus is oriented vertically, and a second step, which is carried out automatically or in an automated manner, in which the poultry body or the part thereof is centred and fixed, wherein the holding apparatus is oriented parallel to the transport direction, namely horizontally.

Advantageously, during the rotation of the holding apparatus and thus of the poultry body or part thereof from the vertical orientation into the horizontal orientation, the poultry body or the part thereof is held and guided by means of at least one impactimpact plate of a saddling assist apparatus. The impactimpact plate "accompanies" the unfastened/unfixed poultry body or the part thereof as it is rotated into the horizontal orientation and thus holds the poultry body or the part thereof on the holding apparatus.

The method is further advantageously characterised in that the poultry body or the part thereof, before fixing and during fixing by the clamping hook, is pressed firmly and flatly onto the holding apparatus by means of a pressing device of a saddling assist apparatus.

The poultry body or the part thereof, before fixing and during fixing by the clamping hook, is optionally centred centrally relative to the holding apparatus in the region of a breastbone crest of the poultry body or of the part thereof by means of a centring device of a saddling apparatus. Centring takes place by the breastbone crest being received in the centring device, so that symmetrical saddling is ensured.

The method is particularly preferably carried out with an apparatus according to claim 15.

The advantages which arise from the method steps set out above have already been described in connection with the transport apparatus, and for this reason, in order to avoid repetition, reference is made to the corresponding passages.

BRIEF DESCRIPTION OF THE DRAWINGS

Further expedient and/or advantageous features and further developments of the transport apparatus, of the apparatus for processing eviscerated poultry bodies or parts thereof, and of the method will become apparent from the description. Particularly preferred embodiments of the invention will be explained in greater detail with reference to the accompanying drawing, in which:

FIG. 4 a to d show a schematic illustration of a holding apparatus formed of a fastening body and a supporting body, in different installation states;

DETAILED DESCRIPTION OF THE INVENTION

Figure 1:
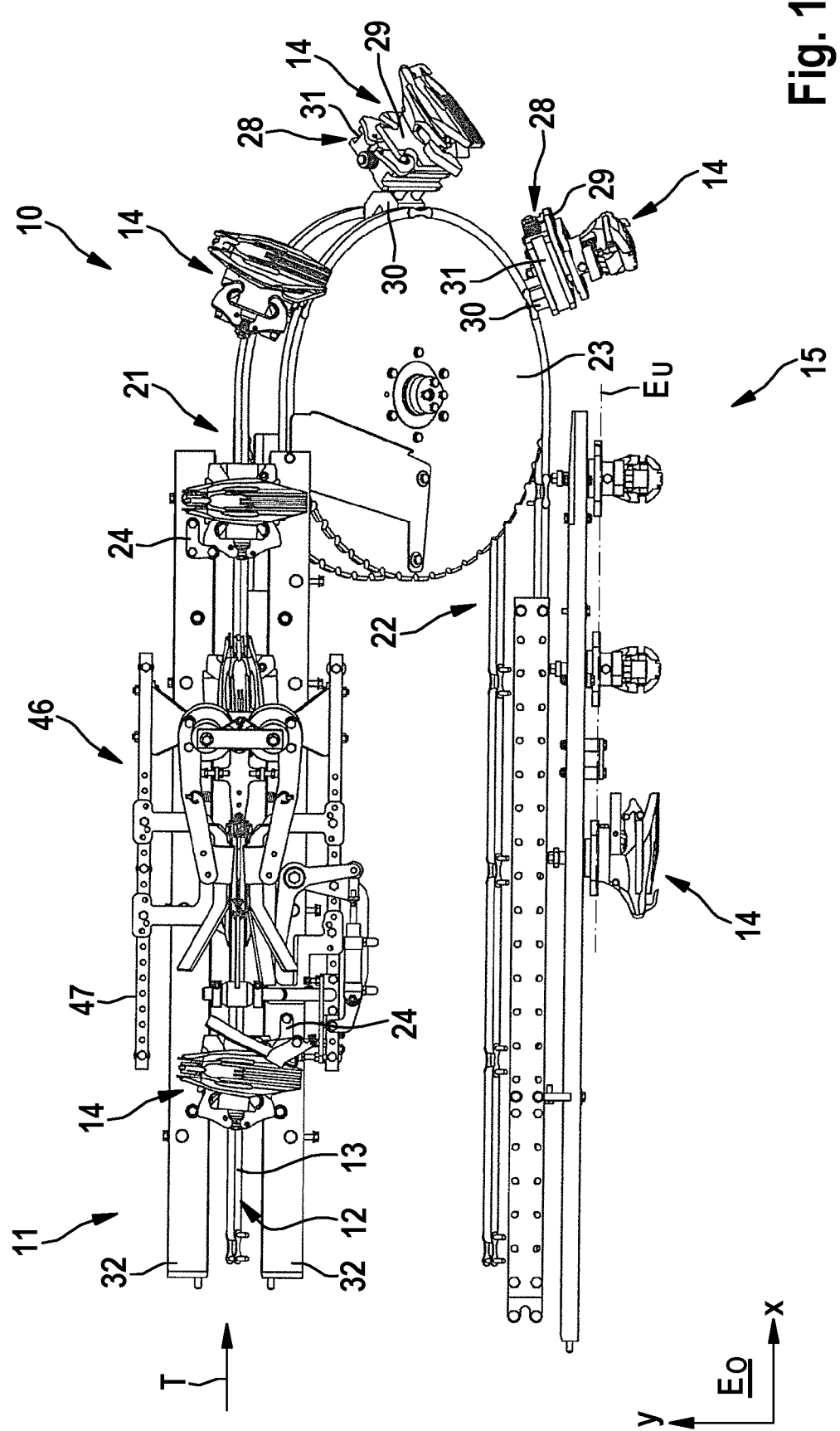
FIG. 1 shows a schematic illustration of a detail of a transport apparatus according to the invention in a front view.

The transport apparatus shown in the drawing is configured and adapted for transporting and fixing front halves of poultry bodies comprising at least parts of a breastbone. The invention is likewise also configured and adapted and can correspondingly be used for transporting and fixing other parts of the poultry body.

Figure 2:
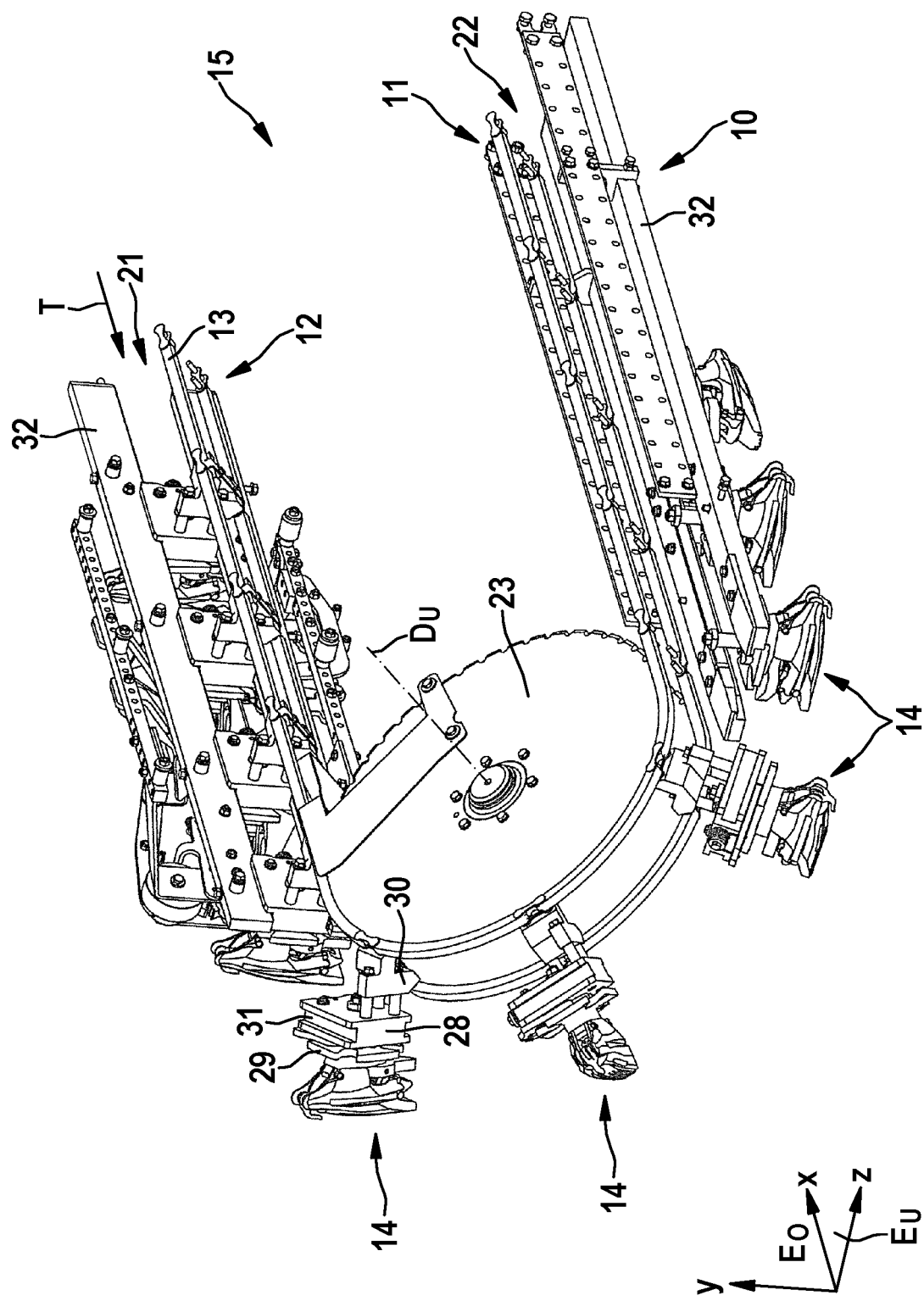
FIG. 2 shows the illustration according to FIG. 1 in a perspective rear view.
Figure 3:
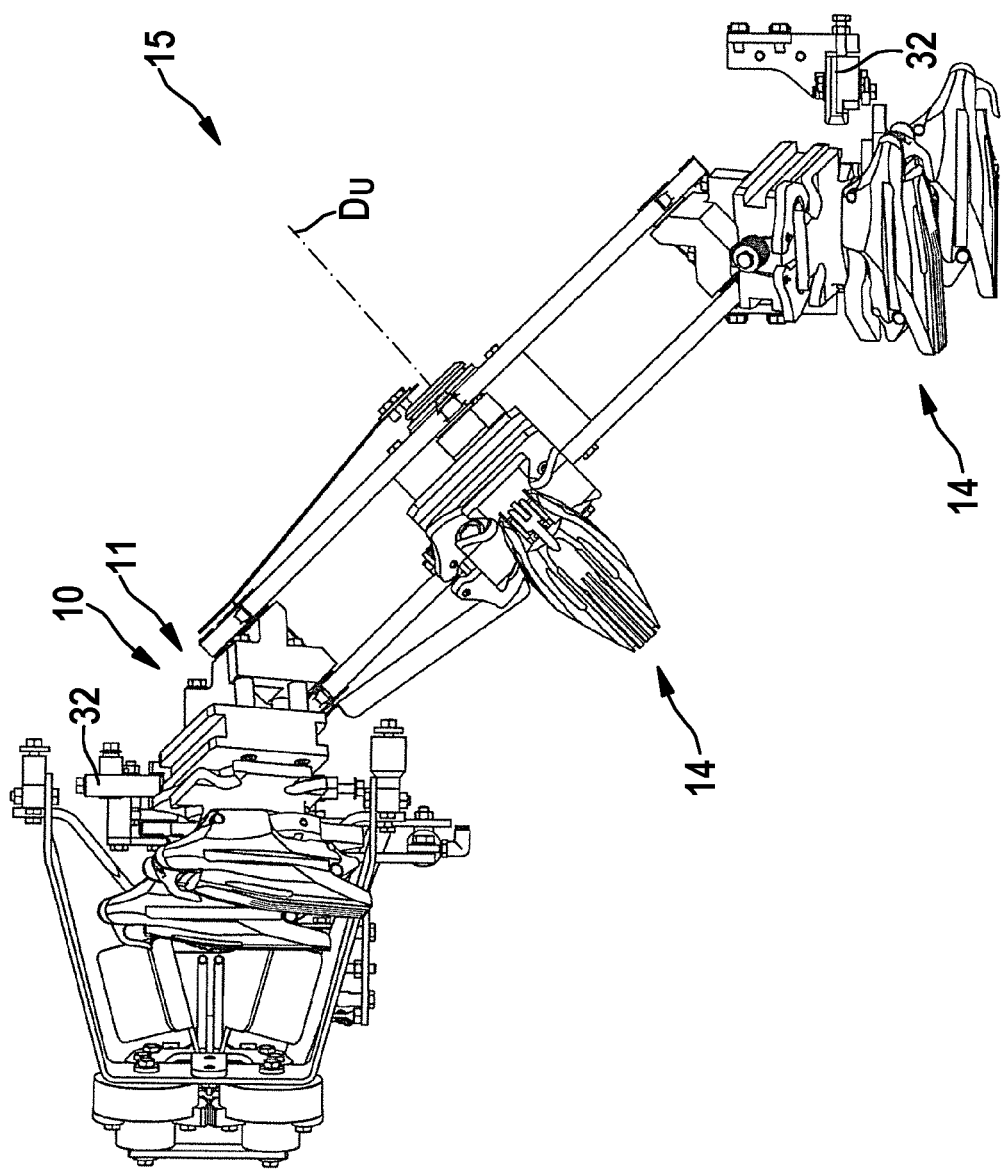
FIG. 3 shows the illustration according to FIG. 1 in a side view.
Figure 5:
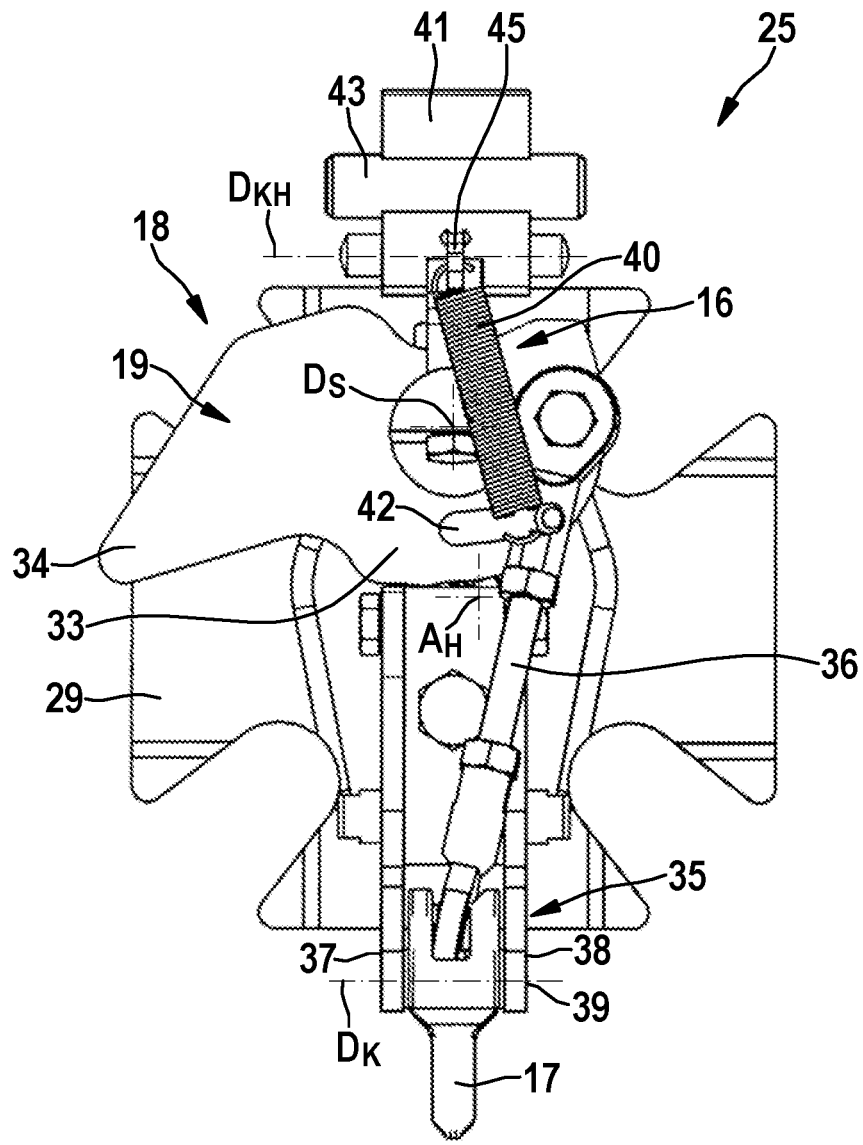
FIG. 5 shows a schematic illustration of the fastening body in a top view with the clamping hook in a standby position.
Figure 6:
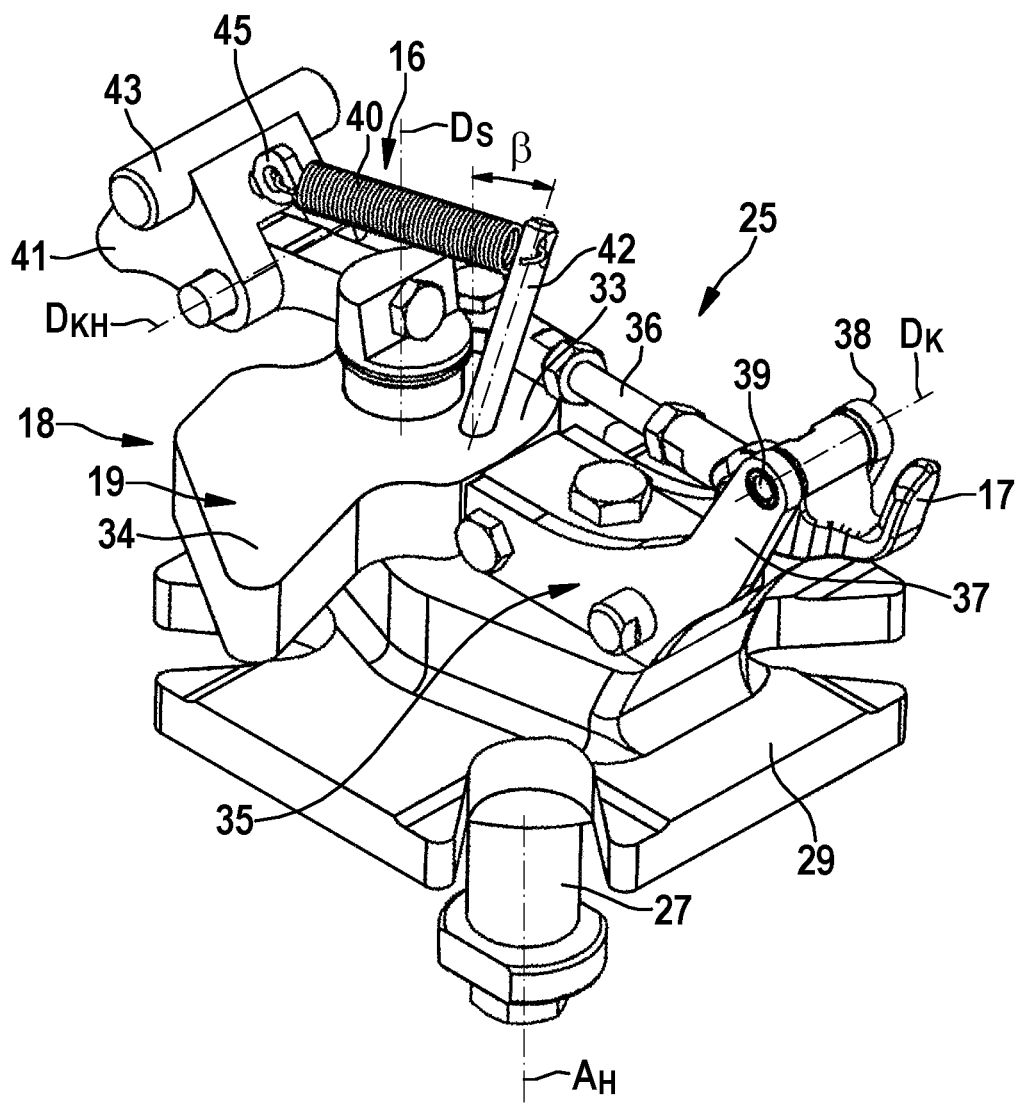
FIG. 6 shows the illustration according to FIG. 5 in a perspective view.
Figure 7:
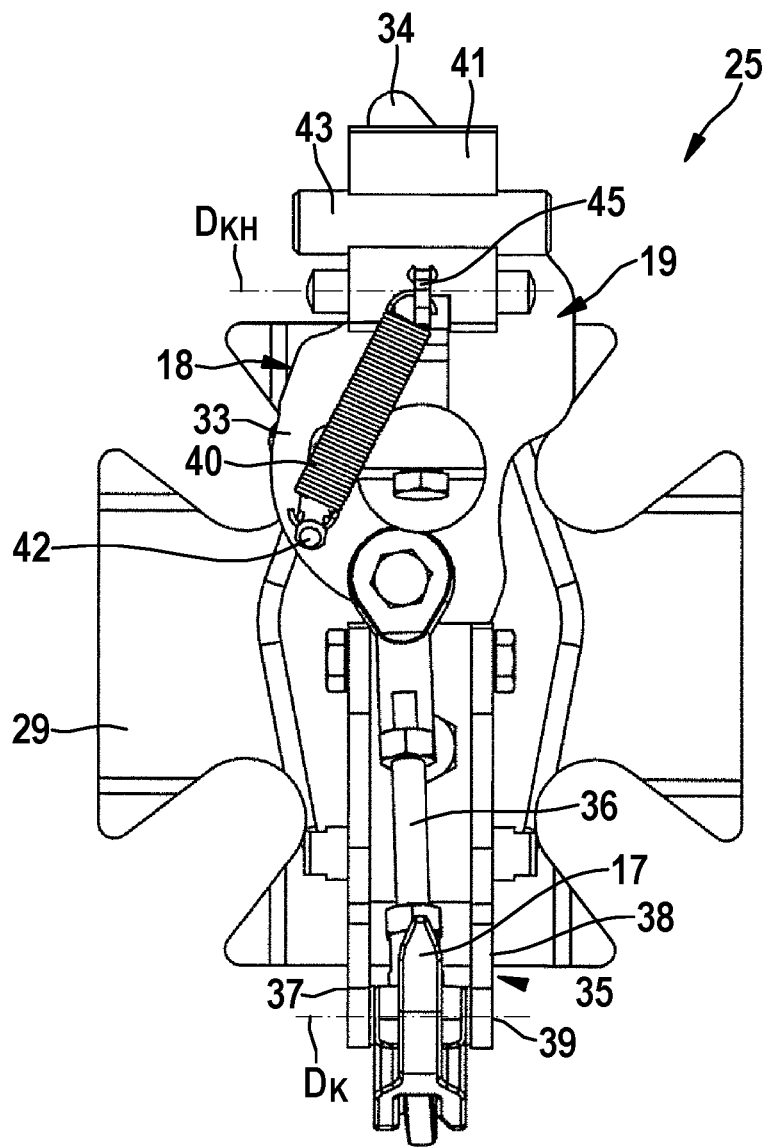
FIG. 7 shows a schematic illustration of the fastening body in a top view with the clamping hook in a clamping position.
Figure 8:
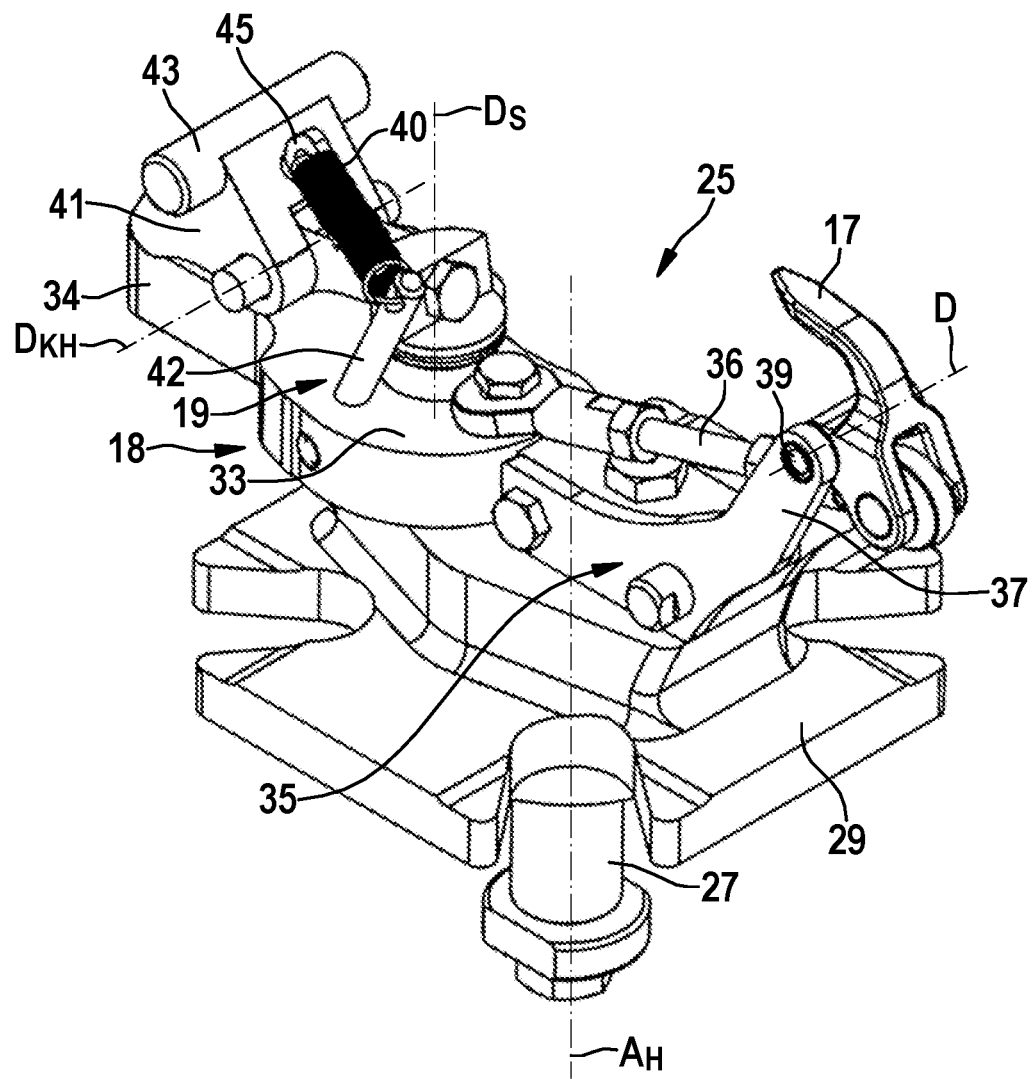
FIG. 8 shows the illustration according to FIG. 7 in a perspective view.

The transport apparatus 10 shown in FIGS. 1 to 3 is configured and adapted for transporting eviscerated poultry bodies or parts thereof, in particular front halves of the poultry bodies, in a transport direction T along a transport path and comprises a frame 11, a transport unit 12 mounted on the frame 11 and having a revolvingly driven transport means 13, and at least one holding apparatus 14 which is fastened to the transport means 13 and is configured and adapted for saddling and holding the poultry body or the part thereof during transport and during processing in an apparatus 15 for processing poultry bodies or parts thereof, wherein the holding apparatus 14 comprises a clamping device 16 which has a clamping hook 17 for fixing the poultry body or the part thereof, which clamping hook is configured to be pivotable by means of an actuating mechanism 18 about a rotational axis $D_K$ from a standby position into a clamping position and back, wherein the actuating mechanism 18 comprises an adjusting lever 19 which is configured to be pivotable about a rotational axis $D_S$ and can be brought into operative connection with an actuating member 20, which is arranged on the frame 11 along the transport path, for pivoting the adjusting lever 19 and thus for pivoting the clamping hook 17.

The number of holding apparatuses 14 is variable. By way of example, a plurality of holding apparatuses 14 are shown, which are preferably releasably fastened, preferably equally spaced apart, to the transport means 13. The transport means 13 forms an upper run 21 and a lower run 22 and is guided around deflection elements 23, which are configured and adapted for deflecting and/or driving the transport means 13 and are rotatable about rotational axes $D_U$. The rotational axes $D_U$ can be oriented vertically or horizontally or in an inclined manner. In the illustration shown by way of example, the rotational axes $D_U$ are inclined by approximately 45° relative to the vertical orientation.

This transport apparatus 10 is distinguished according to the invention in that the holding apparatus 14, at least for the complete saddling of the poultry body or part thereof, is configured and adapted to be rotatable relative to the transport means 13 about an axis $A_H$, which runs perpendicular to the transport direction T, and to that end can be brought into operative connection with an actuating lever 24, which is arranged on the frame 11 along the transport path, and in that the rotational axis $D_S$ of the adjusting lever 19 is oriented perpendicular to the rotational axis $D_K$ of the clamping hook 17, wherein the actuating lever 24 for rotating the holding apparatus 14 is arranged before, in the transport direction T, the actuating member 20 for actuating the adjusting lever 19.

The features and further developments described hereinbelow represent preferred embodiments when considered on their own or in combination with one another. It is expressly pointed out that features which are combined in the description and/or the drawing or are described in a common embodiment can also develop further the transport apparatus 10 described above functionally independently.

Each holding apparatus 14 is optionally in two-part form and comprises a fastening body 25 and a supporting body 26 releasably fastened to the fastening body 25, wherein the fastening body 25 is rotatably mounted about the rotational axis $A_H$ by means of a shaft 27 in a bearing plate 28 fastened to the transport means 13 and comprises a rotating element 29, preferably a rotating cross, which spans a plane $E_D$ and can be brought into operative connection with the actuating lever 24 in order to rotate the fastening body 25 and thus the holding apparatus 14 about the axis $A_H$. The bearing plates 28 can be arranged directly on the transport means 13. Fastening of the bearing plates 28 preferably takes place by way of a connecting element 30. The transport means 13 itself is in the form of a conveyor chain, for example, to which the bearing plates 28 are fastened. The bearing plates 28 have at least one guide groove 31. Guide plates 32 which correspond to/match this guide groove 31 are arranged on the frame 11, which guide plates extend at least in some portions along the upper run 21 and/or the lower run 22.

It will be seen from the example of FIGS. 1 to 3 that different transport planes are defined. In the upper run 21, the holding apparatuses 14 face outwards, while in the lower run 22 they face downwards. As a result of the rotation of the holding apparatuses 14, on the one hand, and the oblique position of the rotational axes $D_U$ of the deflection elements 23, different transport planes are obtained during transport in the transport direction T. In the upper run 21, a vertically directed transport plane $E_O$ is defined, while in the lower run 22 a horizontally directed transport plane $E_U$ is defined. The arrangement of the upper run 21 and the lower run 22 relative to one another and their respective orientation is, however, variable.

The rotation of the holding apparatus 14 through preferably in each case 90°, for example by the use of a so-called maltese cross as the rotating element 29, serves to hold the holding apparatus 14, at least in the region of a saddling position, that is to say a position in which the poultry body or the part thereof is placed onto the holding apparatus 14, in a position oriented vertical to the transport direction T, in order to place the poultry body or the part thereof onto the holding apparatus 14 from the top down. For final and complete saddling, that is to say centring and fixing of the poultry body or of the part thereof on the holding apparatus 14, a horizontal position oriented parallel to the transport direction T is preferred. To that end, the maltese cross can be brought into engagement in each case with an actuating lever 24 which is preferably fixed and stationary—and accordingly is to be referred to as passive. Movable and active actuating elements can, however, also be used. For the fixing itself, the adjusting lever 19 is movable by means of the actuating member 20, such that the clamping hook 17 is movable from its standby position into its clamping position.

The adjusting lever 19, which is preferably of planar form, spans a plane $E_S$ in which it is also pivotable. The adjusting lever 19 comprises an eccentric plate portion 33 and an adjusting portion 34. The rotational axis $D_S$ of the adjusting lever 19 runs parallel to and spaced apart from, that is to say eccentrically to, the axis $A_H$ of the shaft 27, wherein the adjusting lever 19 is pivotable relative to the rotating element 29. The plane $E_S$ of the adjusting lever 19 and the plane $E_D$ of the rotating element 29 thereby run substantially parallel to one another. The adjusting lever 19 is provided for pivoting the clamping hook 17. To that end, the clamping hook 17 of the clamping device 16 is pivotably mounted on a holding structure 35, which in turn is connected to the fastening body 25. The adjusting lever 19 and the clamping hook 17 are connected together by way of an adjusting rod 36, such that the adjusting rod 36 is connected at one end in an articulated and eccentric manner to the eccentric plate portion 33 of the adjusting lever 19 and is connected at the opposite end in an articulated manner to the clamping hook 17, such that the adjusting lever 19 is configured and adapted for moving the clamping hook 17 from a release position past a dead centre into a closed position and back, whereby the clamping hook 17 is movable from its standby position into its clamping position. The or each adjusting rod 36 or any other suitable coupling element is preferably configured to be variably adjustable in its longitudinal extent with respect to the length. In the exemplary embodiment (see in particular FIGS. 5 to 8), the holding structure 35 is formed, for example, by two carrying arms 37, 38 which are releasably arranged on the fastening body 25. A spindle 39 is arranged between the two carrying arms 37, 38 and is mounted or arranged with each of its opposite ends on one carrying arm 37, 38. The clamping hook 17 is arranged in a rotatably or pivotably mounted manner on the spindle 39.

The adjusting lever 19 is preferably spring-biased, wherein a spring element 40 is tensioned between the fastening body 25 and the adjusting lever 19, such that the adjusting lever 19, both in the release position and in the closed position, is held in the respective position. In the example shown, the spring element 40 is tensioned between a movable rocker lever 41 of the fastening body 25, on the one hand, and a pin-like body 42, which is likewise arranged on the eccentric portion 33 eccentrically to the rotational axis $D_S$. The pin-like body 42 is inclined slightly relative to the vertical orientation, that is to say inclined relative to the plane $E_S$ of the adjusting lever 19, preferably by an angle β of approximately from 10° to 30°. The rocker lever 41 is arranged on the fastening body 25 so as to be pivotable about a rotational axis $D_{KH}$ and is at the same time configured and adapted as a locking element for the supporting body 26 on or at the fastening body 25. To that end, the rocker lever 41 has corresponding latching lugs 43, which can be brought into engagement with corresponding recesses 44 in the supporting body 26. The spring element 40 can be arranged directly on the rocker lever 41. In other variants, the spring element 41 can be arranged on a bolt 45 or the like, which is preferably releasably fastened to the rocker lever 41.

The above-described configuration of the holding apparatus 14 is particularly suitable for permitting optimal saddling in that the holding apparatus 14 can be rotated individually into any desired position, in particular also into a position in which it is in a position oriented substantially vertical to the transport direction T for the placing of the poultry body or the part thereof, and also into a position in which it is in a position oriented substantially parallel to the transport direction T for complete saddling, that is to say in particular for centring and fixing. A saddling assist apparatus 46 is preferably arranged after, in the transport direction T, the actuating lever 24 for rotating the holding apparatus 14 from the position oriented substantially vertical to the transport direction T into the position oriented substantially parallel to the transport direction T, which saddling assist apparatus comprises the actuating member 20 for actuating the adjusting lever 19. The saddling assist apparatus 46 can be associated with the upper run 21 and/or with the lower run 22. The saddling assist apparatus 46 is preferably arranged on the frame 11 in the region of the upper run 21. The saddling apparatus 46 comprises a carrying frame 47 which is fastened to the frame 11 of the transport apparatus 10.

Two guide plates 32 are preferably provided, wherein one is arranged above and one below the transport means 13. These guide plates 32 or guide profiles extend in particular in the saddling region, that is to say also and in particular in the region of the saddling assist apparatus 46. There are preferably arranged on the guide plates 32 the actuating levers 24 for rotating the holding apparatus 14, namely, for example, directly before the saddling assist apparatus 46 for rotation from a vertical orientation into a horizontal orientation, and after the saddling assist apparatus 46 for rotation from the horizontal orientation into the vertical orientation. Further actuating levers 24, in particular also in the region of the lower run 22 before and after processing stations, are, however, likewise possible.

The actuating member 20, as part of the saddling assist apparatus 46, comprises a pivot lever 48 which is movable by means of a pneumatic cylinder 49 from a standby position into an actuating position and back, such that the actuating lever 19 of the actuating mechanism 18 can brought from a release position past a dead centre into a closed position. The pneumatic cylinder 49, which is arranged on the carrying frame 47 together with the pivot lever 48, can be triggered mechanically. However, the pneumatic cylinder 49 is preferably controllable by way of a control device (not shown explicitly), to which there can also be connected, for example, the drives for the transport means 13, possible sensors or the like. The pivot lever 48 is so arranged and configured that, when it is actuated, it guides the adjusting lever 19 to the dead centre, such that the adjusting lever 19, on overcoming the dead centre, "jumps" into the closed position. The adjusting lever 19 is actuated by the pivot lever 48 past the dead centre into the end position.

Figure 9:
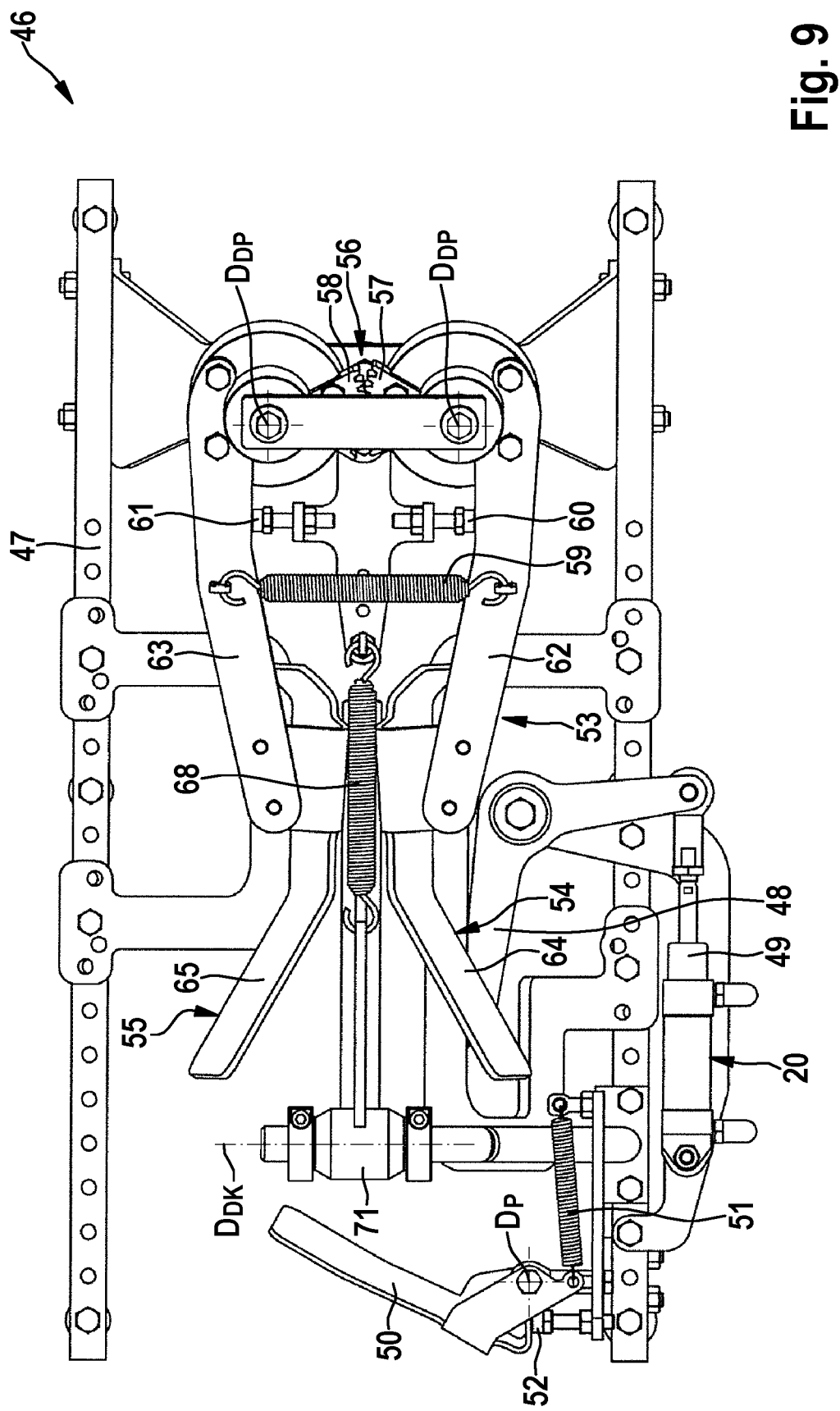
FIG. 9 shows a schematic illustration of a saddling assist apparatus in a front view.
Figure 10:
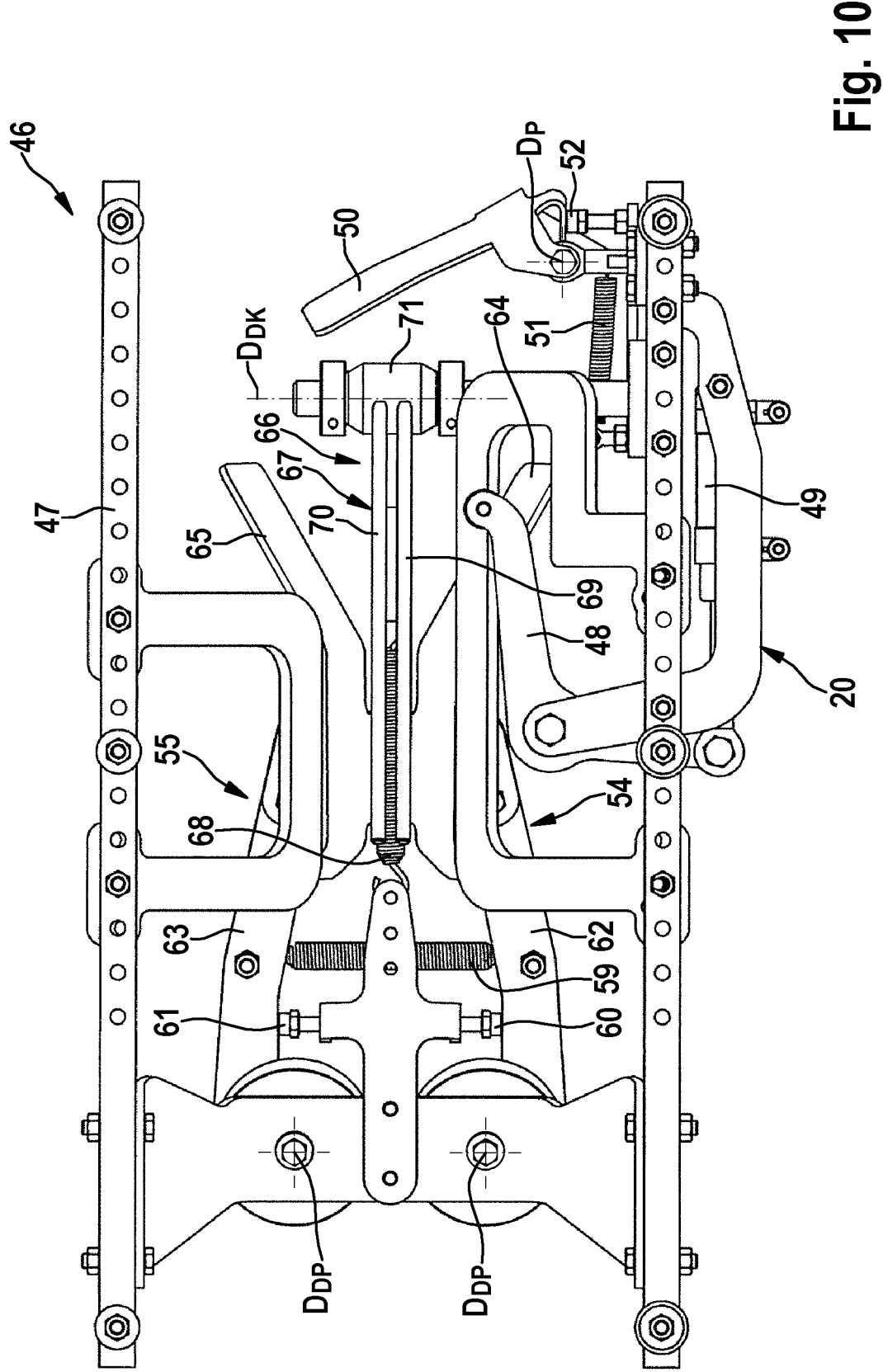
FIG. 10 shows the illustration according to FIG. 9 in a rear view.

The saddling assist apparatus 46 comprises at least one impactimpact plate 50, which projects into the transport path in a starting position and is spring-mounted, such that the impact plate 50 is movable against a spring force into a guiding position by any holding apparatus 14 having the poultry body or the part thereof that is transported along the transport path. It can be seen in particular in FIGS. 9 and 10 that the or each impact plate 50 is mounted on the carrying frame 47 so as to be pivotable about a rotational axis $D_P$. The impact plate 50 can be a simple sheet-metal impact. In other embodiments, other impact elements can also be used. The impact plate 50 is arranged in the transport direction T approximately at the height of the actuating lever 24 for rotating the holding apparatus 14 and is held in its starting position by means of a spring element 51 against an abutment 52, which is formed on the carrying frame 47. The spring element 51 can also be replaced by a different damping element, for example a pneumatic cylinder. The spring force of the spring element 51 or of any other damping element is optionally adjustable.

The saddling assist apparatus 46 can further comprise a pressing device 53 which has two spring-mounted pressure plates 54, 55 which are configured and adapted for guiding and/or holding the poultry body or the part thereof on the holding apparatus 14. Each pressure plate 54, 55 is mounted on the carrying frame 47 so as to be pivotable about a rotational axis $D_{DP}$. The pivot movement takes place substantially parallel to the transport plane $E_O$ of the upper run 21. In other words, the rotational axes $D_{DP}$ are perpendicular or substantially perpendicular, that is to say with a slight inclination of a few degrees, to the transport plane $E_O$. The two pressure plates 54, 55 are preferably in operative connection with one another, namely preferably by way of a synchronous gear 56 which is formed of two toothed segments 57, 58 which mesh with one another. Thus, the two pressure plates 54, 55 are synchronised in terms of movability towards one another and away from one another, wherein the two pressure plates 54, 55 are each held against an abutment 60, 61 in a standby position by a spring element 59. The synchronisation of the two pressure plates 54, 55 can also be achieved in other ways. The pressure plates 54, 55 are arranged spaced apart from one another, such that the holding apparatus 14 in its orientation parallel to the transport direction T can be moved between the pressure plates 54, 55. In other words, one pressure plate 54 is arranged above and the other pressure plate 55 is arranged below the holding apparatus 14, if the holding apparatus 14 is located in the saddling assist apparatus 46.

The spring element 59 is tensioned between the two pressure plates 54, 55 and is exchangeable, in particular also for the purpose of adjusting the spring force. In the preferred embodiment shown, each pressure plate 54, 55 is in two-part form. Each pressure plate 54, 55 namely comprises a support portion 62, 63 and a pressing portion 64, 65. The support portion 62, 63 and the pressing portion 64, 65 are in each case releasably connected to one another. The pressure plates 54, 55 can, however, also be in one-part or multi-part form. The pressure plates 54, 55 and in particular the pressing portions 64, 65 thereof, which come into contact with the poultry body or the part thereof, run in the transport direction T in two planes in such a manner that they are inclined relative to one another and converge. Other forms and configurations of the pressure plates 54, 55 are, however, likewise possible.

The saddling assist apparatus 46 optionally comprises a centring device 66 for centring the poultry body or part thereof on the holding apparatus 14, which centring device has a forked element 67 which is arranged on the carrying frame 47 of the saddling assist apparatus 46 in such a manner that it can be deflected against the spring force of a spring element 68. The forked element 67 has two bars 69, 70 which are arranged spaced apart from one another and are configured and adapted for centring a breastbone crest of the poultry body or part thereof to be transported. The two bars 69, 70 are preferably circular profiles which are arranged, forming a gap, on a rotating body 71 which is rotatably mounted on the carrying frame 47. The spring element 68 holds the rotating body 71 with the bars 69, 70 in a standby position in which the holding apparatus 14 with the poultry body or the part thereof necessarily meets the bars 69, 70, which then, as transport continues and the spring force increases, guide the breastbone or the breastbone crest. The rotating body 71 itself is rotatable about a rotational axis $D_{DK}$ which is oriented substantially perpendicular to the transport direction T.

Along the transport path there is also provided at least one unlocking device (not explicitly shown), by means of which the adjusting lever 19 is movable from its closed position into the release position in order to pivot the clamping hook 17 in turn from the clamping position into the standby position.

The transport apparatus 10 forms an independent unit. However, the transport apparatus 10 is preferably part of an apparatus 15 for processing eviscerated poultry bodies or parts thereof, in particular front halves of the poultry bodies, comprising a transport apparatus 10 for transporting the poultry bodies or parts thereof along at least one processing station for processing the poultry bodies or parts thereof, and at least one processing station for processing the poultry bodies or parts thereof. This apparatus 15 is distinguished according to the invention in that the transport apparatus 10 for transporting the poultry bodies or parts thereof is configured and adapted as disclosed herein.

The or each processing station is preferably arranged in the region of the lower run 22, so that the poultry body or the part thereof is transported upside down, which in particular facilitates the obtaining of breast fillets from front halves of the poultry bodies.

The method will be explained in greater detail hereinbelow with reference to the drawing. The method serves for the saddling and processing of an eviscerated poultry body or part thereof, in particular of a front half of the poultry body. This method is characterised according to the invention by the following steps: The poultry body or the part thereof is first placed from the top down onto a substantially vertically oriented holding apparatus 14 of a transport apparatus 10. Placing takes place substantially without force and without orienting and centring the poultry body or the part thereof. Placing can be carried out manually or in an automated manner, for example by means of a robot. After placing, the holding apparatus 14 and thus the poultry body or the part thereof, which is still free, is rotated from the position oriented substantially vertical to the transport direction T into a position oriented substantially parallel to the transport direction T during transport of the poultry body or part thereof in the transport direction T along a transport path. Rotation takes place in an automated manner. After rotation, the poultry body or the part thereof is fixed on the holding apparatus 14 by the triggering of a pivot movement of a clamping hook 17 from a standby position into a clamping position during transport in the transport direction T. Fixing also takes place in an automated manner. After fixing, the poultry body or the part thereof is processed, while it is being transported, at least one processing station arranged along the transport path. Processing can take place in the position oriented horizontal and parallel to the transport direction T or in the position oriented vertical to the transport direction T. After rotation of the holding apparatus 14 and before and during fixing, the poultry body or the part thereof is centred on the holding apparatus 14. The method according to the invention can thus be carried out semi-automatically or fully automatically.

The poultry body or the part thereof is preferably held and guided by means of at least one impact plate of a saddling assist apparatus during the rotation of the holding apparatus and thus of the poultry body or of the part thereof from the vertical orientation into the horizontal orientation. During transport in the transport direction T, the poultry body or the part thereof is supported and held during the rotation into the horizontal orientation by the impact plate, which deflects into the guiding position.

For complete saddling, the poultry body or the part thereof, before fixing and during fixing, is pressed firmly and flatly onto the holding apparatus 14 by means of a pressing device 53 of a saddling assist apparatus 46. As a result of being transported in the transport direction T towards the pressing device 53, the poultry body or the part thereof is pressed firmly and completely onto the holding apparatus 14 and is held thereon. To that end, the holding apparatus 14 having the poultry body or the part thereof is moved between pressure plates 54, 55 of the pressing device 53, which are deflected against a spring force by the poultry body or the part thereof. At the same time, the poultry body or the part thereof, before fixing and during fixing, is centred centrally relative to the holding apparatus 14 in the region of a breastbone crest of the poultry body or of the part thereof by means of a centring device 66 of a saddling apparatus 46. On transport in the transport direction T, the breastbone crest is threaded between two spring-mounted bars 70, 71. The poultry body or the part thereof is thereby oriented and positioned symmetrically on the holding apparatus 14, before and while the clamping hook 17 is pivoted into its clamping position by means of a pivot lever 48, which is actuated by a pneumatic cylinder 49.

The method is very particularly preferably carried out as disclosed herein.

The invention claimed is:

1. A transport apparatus, configured and adapted for transporting eviscerated poultry bodies or parts thereof, in particular front halves of the poultry bodies, in a transport direction along a transport path, comprising:
   a frame;
   a transport unit mounted on the frame and having a revolvingly driven transport means;
   at least one holding apparatus which is fastened to the transport means and is configured and adapted for saddling and holding the poultry body or the part thereof during transport and during processing in an apparatus for processing poultry bodies or parts thereof, the holding apparatus comprising;
   a clamping device having a clamping hook for fixing the poultry body or the part thereof, clamping hook configured to be pivotable by an actuating mechanism about a rotational axis from a standby position into a clamping position and back;
   the actuating mechanism comprising an adjusting lever configured to be pivotable about a rotational axis and to be brought into operative connection with an actuating member arranged on the frame along the transport path, for pivoting the adjusting lever and thus for pivoting the clamping hook;
   wherein;
   the at least one holding apparatus, at least for the complete saddling of the poultry body or of the part thereof, is configured and adapted to be rotatable relative to the transport means about an axis which runs perpendicular to the transport direction, and to that end can be brought into operative connection with an actuating lever which is arranged on the frame along the transport path;
   the rotational axis of the adjusting lever is oriented perpendicular to the rotational axis of the clamping hook; and
   the actuating lever for rotating the holding apparatus is arranged before, in the transport direction, the actuating member for actuating the adjusting lever.

2. The transport apparatus according to claim 1, wherein:
   the holding apparatus comprises a fastening body and a supporting body which is releasably fastened to the fastening body;
   the fastening body being rotatably mounted about the rotational axis of the at least one holding apparatus by a shaft in a bearing plate fastened to the transport means and comprising a rotating element, which spans a plane and, for rotation of the fastening body and thus of the at least one holding apparatus about the rotational axis of the at least one holding apparatus, can be brought into operative connection with the actuating lever.

3. The transport apparatus according to claim 2, wherein:
   the adjusting lever spanning a plane comprises an eccentric plate portion and an adjusting portion, and the rotational axis of the adjusting lever runs parallel to and spaced apart from the the rotational axis of the at least one holding apparatus;
   the adjusting lever is pivotable relative to the rotating element; and
   the plane spanned by the adjusting lever and the plane spanned by the rotating element run substantially parallel to one another.

4. The transport apparatus according to claim 3 wherein:
   the clamping hook of the clamping device is pivotably mounted on a holding structure, which in turn is connected to the fastening body;
   the adjusting lever and the clamping hook are connected together by way of an adjusting rod, such that the adjusting rod is connected at one end in an articulated and eccentric manner to the eccentric plate portion of the adjusting lever and is connected at an opposite end in an articulated manner to the clamping hook, such that the adjusting lever for moving the clamping hook is configured and adapted to be movable from a release position past a dead centre into a closed position and back.

5. The transport apparatus according to claim 4, wherein:
   the adjusting lever is spring-biased by a spring element tensioned between the fastening body and the adjusting lever, such that, both in the release position and in the closed position, the adjusting lever is held in the respective position.

6. The transport apparatus according to claim 1, further comprising:
   a saddling assist apparatus arranged after, in the transport direction, the actuating lever for rotating the holding apparatus from a position oriented substantially vertical to the transport direction into a position oriented substantially parallel to the transport direction, the saddling assist apparatus comprising the actuating member for actuating the adjusting lever.

7. The transport apparatus according to claim 6, wherein the actuating member comprises a pivot lever which is movable by a pneumatic cylinder from a standby position into an actuating position and back, such that the adjusting lever of the actuating mechanism can be brought from a release position past a dead centre into a closed position.

8. The transport apparatus according to claim 6, wherein the saddling assist apparatus comprises at least one impact plate which projects into the transport path in a starting position and is spring-mounted, such that the impact plate is movable against a spring force into a guiding position by any the at least one holding apparatus having the poultry body or part thereof that is transported along the transport path.

9. The transport apparatus according to claim 8, wherein the impact plate is arranged in the transport direction approximately at a height of the actuating lever for rotating the holding apparatus and is held against an abutment in its starting position by a spring element (51).

10. The transport apparatus according to claim 6, wherein the saddling assist apparatus comprises a pressing device which has two spring-mounted pressure plates which are configured and adapted for guiding and/or holding the poultry body or the part thereof on the respective holding apparatus.

11. The transport apparatus according to claim 10, wherein the two pressure plates are synchronised in respect of movability towards one another and away from one another by way of a synchronous gear, and the two pressure plates are each held against an abutment in a standby position by a spring element.

12. The transport apparatus according to claim 10, wherein the pressure plates run in the transport direction in two planes in such a manner that they are inclined relative to one another and converge.

13. The transport apparatus according to claim 6, wherein the saddling assist apparatus comprises a centring device for centring the poultry body or part thereof on the holding apparatus, the centring device having a forked element which is arranged on a carrying frame of the saddling assist apparatus in such a manner that the forked element can be deflected against a spring force of a spring element.

14. The transport apparatus according to claim 13, wherein the forked element has two bars which are arranged spaced apart from one another and are configured and adapted for centring a breastbone crest of the poultry body or part thereof to be transported.

15. An apparatus for processing eviscerated poultry bodies or parts thereof, in particular front halves of the poultry bodies, comprising:
- a transport apparatus for transporting the poultry bodies or parts thereof along at least one processing station for processing the poultry bodies or parts thereof;
- at least one processing station for processing the poultry bodies or parts thereof;
- wherein the transport apparatus for transporting the poultry bodies or parts thereof is in accordance with claim 1.

16. A method for saddling and processing an eviscerated poultry body or a part thereof, in particular a front half of the poultry body, comprising the following steps: placing the poultry body or part thereof from a top down onto a substantially vertically oriented holding apparatus of a transport apparatus;
- rotating the holding apparatus and thus the poultry body or part thereof, which is still free, from a position oriented substantially vertical to the transport direction into a position oriented substantially parallel to the transport direction during transport of the poultry body or part thereof in the transport direction along a transport path;
- fixing the poultry body or the part thereof on the holding apparatus by triggering a pivot movement of a clamping hook from a standby position into a clamping position during transport in the transport direction; and processing the poultry body or part thereof during transport thereof at least one processing station arranged along the transport path.

17. The method according to claim 16, wherein, during the rotation of the holding apparatus and thus of the poultry body or part thereof from the vertical orientation into the horizontal orientation, the poultry body or the part thereof is held and guided by at least one impact plate of a saddling assist apparatus.

18. The method according to claim 16, wherein the poultry body or the part thereof, before fixing and during fixing, is pressed firmly and flatly onto the holding apparatus by a pressing device of a saddling assist apparatus.

19. The method according to claim 16, wherein, before fixing and during fixing, the poultry body or the part thereof is centred centrally relative to the holding apparatus in a region of a breastbone crest of the poultry body or of the part thereof by a centring device of a saddling apparatus.

20. The method according to claim 16, wherein the method is carried out with an apparatus comprising:
- a transport apparatus for transporting the poultry bodies or parts thereof, in particular a front half of the poultry body, along at least one processing station for processing the poultry bodies or parts thereof;
- at least one processing station for processing the poultry bodies or parts thereof;
- wherein the transport apparatus comprises:
- a frame;
- a transport unit mounted on the frame and having a revolvingly driven transport means;
- at least one holding apparatus which is fastened to the transport means and is configured and adapted for saddling and holding the poultry body or the part thereof during transport and during processing in an apparatus for processing poultry bodies or parts thereof, the holding apparatus comprising;
- a clamping device having a clamping hook for fixing the poultry body or the part thereof, clamping hook configured to be pivotable by an actuating mechanism about a rotational axis from a standby position into a clamping position and back;
- the actuating mechanism comprising an adjusting lever configured to be pivotable about a rotational axis and to be brought into operative connection with an actuating member arranged on the frame along the transport path, for pivoting the adjusting lever and thus for pivoting the clamping hook;
- wherein;
- the at least one holding apparatus, at least for the complete saddling of the poultry body or of the part thereof, is configured and adapted to be rotatable relative to the transport means about an axis which runs perpendicular to the transport direction, and to that end can be brought into operative connection with an actuating lever which is arranged on the frame along the transport path;
- the rotational axis of the adjusting lever is oriented perpendicular to the rotational axis of the clamping hook; and
- the actuating lever for rotating the holding apparatus is arranged before, in the transport direction, the actuating member for actuating the adjusting lever.

\* \* \* \* \*